US005566645A

United States Patent [19]
Cole

[11] Patent Number: 5,566,645
[45] Date of Patent: Oct. 22, 1996

[54] ANIMAL TRAINING METHOD AND APPARATUS

[76] Inventor: Toni H. Cole, 2280 Cemetery Rd., Sunnyside, Wash. 98944

[21] Appl. No.: 284,075

[22] Filed: Aug. 1, 1994

[51] Int. Cl.⁶ .................. B68B 1/00; A01K 15/00
[52] U.S. Cl. .............. 119/712; 119/905; 604/79; 54/8; 54/71
[58] Field of Search .................. 119/712, 905, 119/833; 54/7, 8, 9, 71, 6.1; 604/79; 222/175, 608, 633; 239/152, 153, 154

[56] References Cited

U.S. PATENT DOCUMENTS

| | | | |
|---|---|---|---|
| 383,440 | 5/1888 | Collyer | 604/79 |
| 432,513 | 7/1890 | Cox | 604/79 |
| 874,239 | 12/1907 | Ratliff | 604/79 |
| 969,482 | 9/1910 | Jones | 604/79 |
| 1,003,856 | 9/1911 | Adams | 239/154 |
| 1,121,435 | 12/1914 | White | 604/79 |
| 1,150,848 | 8/1915 | Biasiolli | 604/79 |
| 1,238,390 | 8/1917 | Crittenden | 604/79 |
| 3,513,811 | 12/1967 | Graham | 119/72.5 |
| 3,734,063 | 5/1973 | Atchley | 119/72.5 |
| 3,995,596 | 12/1976 | Andersson | 119/72.5 |
| 4,022,159 | 5/1977 | Salvia | 119/72.5 |
| 4,040,422 | 8/1977 | Kuhn | 604/79 |
| 4,063,404 | 12/1977 | Taylor | 54/8 |
| 4,629,098 | 12/1986 | Eger | 222/529 |
| 4,966,580 | 10/1990 | Turner et al. | 604/79 X |
| 5,062,591 | 11/1991 | Runkel | 222/608 |
| 5,156,593 | 10/1992 | Green | 604/79 X |
| 5,201,442 | 4/1993 | Bakalian | 222/608 X |

FOREIGN PATENT DOCUMENTS

| | | | |
|---|---|---|---|
| 559687 | 9/1923 | France | 119/833 |
| 0002155 | of 1903 | United Kingdom | 604/79 |

Primary Examiner—Robert P. Swiatek
Assistant Examiner—Yvonne R. Abbott
Attorney, Agent, or Firm—Stratton Ballew PLLC

[57] ABSTRACT

A method for animal training. More specifically, this invention provides a method for rapidly and effectively training horses and other animals by facilitating the delivery of a primary reinforcement reward substance to the animal simultaneously with, or immediately following the exhibition of desired behavior by the animal.

17 Claims, 15 Drawing Sheets

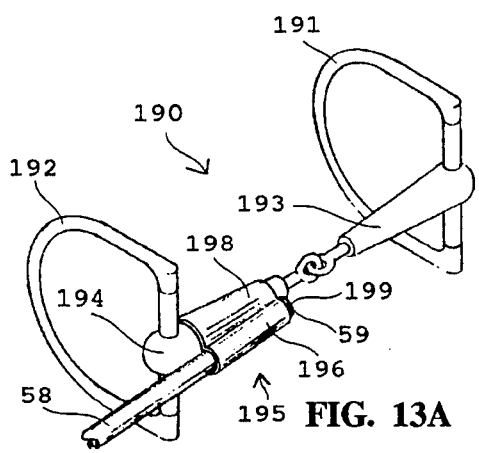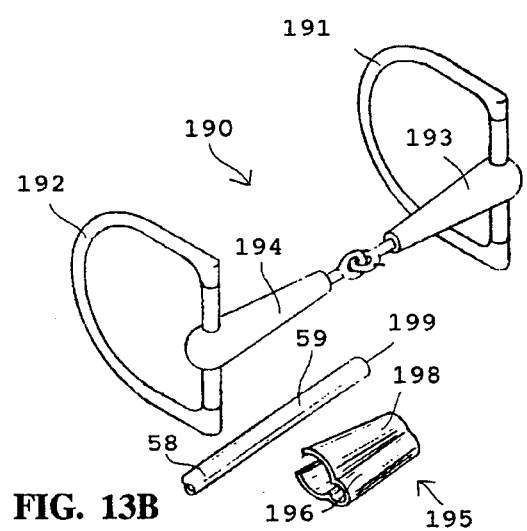

5,566,645

ANIMAL TRAINING METHOD AND APPARATUS

TECHNICAL FIELD

This invention relates to a method and apparatus for animal training. More specifically, this invention provides a method and apparatus for delivering immediate primary reinforcement to enhance the training of horses and other animals.

BACKGROUND OF INVENTION

Positive reinforcement and negative reinforcement are two common techniques used for training animals. Negative reinforcement teaches through punishment which actions are forbidden. Positive reinforcement provides a reward for desired behavior, thereby increasing the probability that the desired behavior will be repeated. Both reinforcement methods are generally most successful when the punishment or reward is provided as soon as possible after the performance of the behavior. Animal behavior changes accomplished using positive reinforcement techniques tend to outlast behavior changes resulting from negative reinforcement and other training methods, since the animal's desire to perform is increased by the positive reinforcement technique.

Primary reinforcement is a positive reinforcement technique which rewards good behavior by satisfying a primary need of the animal in training, such as the need for food or water. Like any positive reinforcement method, primary reinforcement is most effective when the reward is provided immediately upon performance of the desired behavior.

The primary reinforcement method can be highly effective in training horses and other animals. However, providing an immediate primary reward for the desired action is often difficult, if not impossible, for the trainer to accomplish. As the time between the desired behavior and the reward increases, the effectiveness and usefulness of the primary reinforcement method severely decreases. Also, as the time between the desired behavior and the reward increases the animal in training may exhibit undesired behaviors in connection with desired behaviors. By giving the animal a reward following a behavior pattern which includes desired and undesired behavior, the trainer will reinforce the entire behavior pattern, making eradication of the reinforced undesired behavior extremely difficult. For these reasons, current training programs which incorporate primary reinforcement techniques take approximately the same amount of time to satisfactorily train an animal as do negative reinforcement and other training methods. The current major benefit achieved by incorporating primary reinforcement techniques into an animal training program is that the animal behavior changes accomplished using primary reinforcement techniques occur more rapidly and tend to outlast behavior changes resulting from negative reinforcement and other training methods.

One animal commonly trained by man is the horse. Horses require extensive training for a wide variety of activities such as racing, barrels, reining, combined training, hunting, jumping, endurance riding, polo, harness, dressage, pleasure riding, trail riding, and many other recreational and commercial uses.

Current training programs for these activities, including training programs which utilize primary reinforcement, may take several years to fully train the horse. This lengthy training period is mostly due to the current time delay between training rewards and the horse's desired behavior. The trainer is often riding the horse during training, making it impossible to respond with a primary reward immediately. At other times, whether the trainer is seated on the horse or not, it would be disruptive to stop the horse's maneuvers in order to reward him. In dressage especially, the smooth, graceful flow of movement is of critical importance in competition, and must be stressed in training sessions as well.

Other animals commonly trained by man include mules, llamas, alpacas, goats, and other pack animals. These animals are becoming increasingly popular as pack animals for recreational use because of their relatively low impact on the environment. Dogs are also frequently trained for pure domestication purposes, or racing, hunting, defense purposes, and other recreational and commercial uses. Many of the training programs currently used to train these animals also require several years to produce fully trained animals. As with the difficulties in current training programs for horses, this length of time is mostly due to the current time delays between the exhibition of the desired behavior of the animal in training, and a training reward reinforcing the desired behavior. Using current training methods and devices, it is not possible to reward an animal simultaneously with, or immediately following, the exhibition of desired behavior.

It would be advantageous, therefore, to substantially eliminate the time delay between the performance of a desired behavior and the delivery of the reward in a primary reinforcement training program for animals, including horses. It would also be advantageous to substantially reduce the total time required to fully train animals, including horses, for a specific activity. Finally, it would be advantageous to accomplish the rapid training of animals, including horses, by using a primary reinforcement training method and apparatus, in order to achieve effective, long lasting behavior modification.

SUMMARY OF THE INVENTION

In a preferred embodiment of the method and apparatus used to accomplish these objectives, a food or water substance is used as the primary reinforcement reward. The reward substance is stored in a reservoir which is connected to the animal's mouth by a tube. The reservoir can be attached to the trainer mounted on the animal, or can be attached to the animal itself. A manually or remotely controlled flow control mechanism is used by the trainer to dispense the reward substance to the animal immediately following or simultaneously with exhibition of the desired behavior.

BRIEF DESCRIPTION OF DRAWINGS

FIG. 13A is a perspective drawing of an alternative preferred embodiment of a reward substance dispensing mechanism used with an unmodified bit.

FIG. 13B is a partially exploded view of FIG. 12A.

BEST MODE OF PRACTICING THE INVENTION

This new invention utilizes primary reinforcement techniques, in combination with a new training apparatus and method, to rapidly achieve lasting behavior modification in animals. In a preferred embodiment, the invention is used in training horses. However, the invention is also contemplated for use with animals other than horses, such as mules, llamas, alpacas, goats, and dogs.

Figure 1:
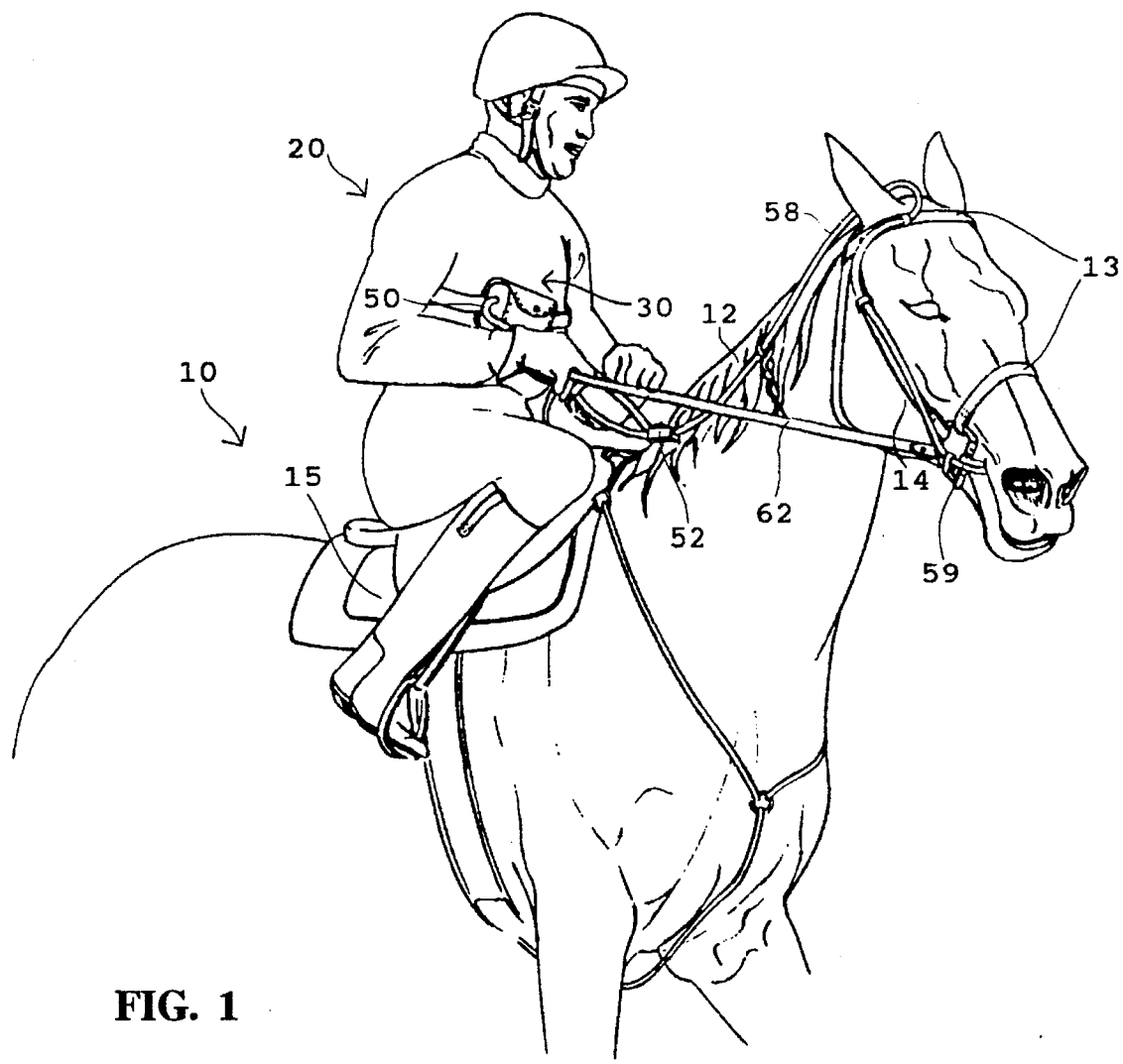
FIG. 1 is a perspective drawing of a preferred embodiment of the invention.

A trainer 20 uses a training apparatus as shown in FIG. 1 to provide immediate primary reinforcement to a horse 10. First, the training apparatus is securely fastened to the headstall 13, reins 62, and saddle 15 or trainer 20 (see FIG. 1). A fluid reservoir assembly 30 is worn by trainer 20. Supply tube 50 extends from fluid reservoir assembly 30 to valve 52. Delivery tube 58 begins at valve 52 and extends up the neck of the horse, where it is fastened to the horse's mane 12 with clips or other fasteners (not shown). Delivery tube 58 passes over the horse's head and along bridle 14 to the horse's mouth.

In the new training method of this invention, the trainer 20 selects a reward substance to use during the training session, prior to the beginning of the training session. Examples of reward substances include fruit juice, sugar water, molasses, applesauce, jelly, and slurries or paste-like food substances. Prior to the beginning of the training session, trainer 20 fills the fluid reservoir 42 (see FIG. 2) with the selected reward substance. As the training session is about the begin, trainer 20 opens valve 52 causing the delivery of reward substance into the horses mouth, in order to get the horse's attention, and to prepare the horse for the expectation of receiving future doses of the pleasant tasting reward substance. Once the training session begins, each time trainer 20 observes the horse performing or attempting to perform a desired behavior, the trainer can operate valve 52, causing reward substance to be dispensed into the horse's mouth. By using the training apparatus of this invention, trainer 20 is able to dispense reward substance to the horse 10 immediately following or simultaneously with the horse's exhibition of the desired behavior. A positive association is thus established between the desired behavior and the pleasant taste of the reward substance.

This sequence desired behavior immediately or simultaneously rewarded via the training apparatus is repeated until the horse has learned the desired behavior. As the behavior becomes more confirmed, trainer 20 dispenses the reward substance every third or fourth time the behavior is exhibited, rather than every time the desired behavior is exhibited. This variable schedule of reinforcement keeps the desire for the reward substance fresh in the horse's mind. Also, overuse of the reward substance can cause the horse to become satiated, and significantly diminish the reward substance's training effectiveness.

The new training method and apparatus is used effectively in conjunction with other training aids and techniques, such as praise and petting, or whips and spurs. In one preferred embodiment of the new training method, the new training apparatus is used to positively reinforce desired behavior while negative reinforcement training apparatus, such as whips and spurs, are used to identify and eliminate undesirable behavior exhibited by the animal.

Figure 2:
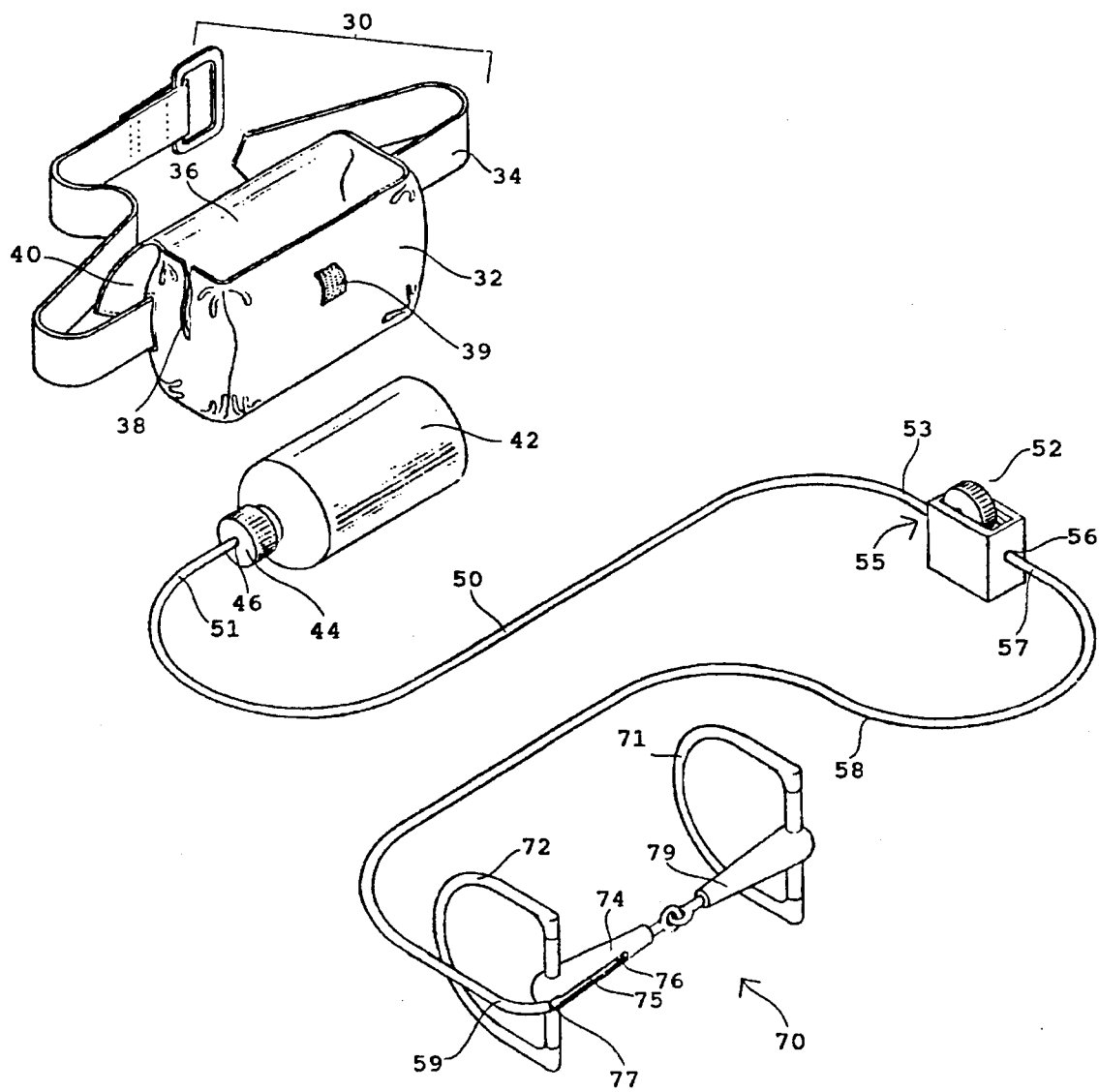
FIG. 2 is a perspective drawing of a preferred embodiment of the invention.

FIG. 2 depicts a preferred embodiment of the new training apparatus. The reward substance reservoir assembly 30 includes a carrying case 32 having a belt 34, a reservoir compartment 36, a slot 38 and carrying case cover 40 (shown folded over in an open position). A reservoir 42 containing a reward substance, having a lid 44 and a lid aperture 46 which receives first end 51 of supply tube 50 so that first end 51 is placed into the reward substance, is placed in reservoir compartment 36, so that first end 51 of supply tube 50 rests in slot 38. The carrying case cover 40 can then be secured with fastener 39 over reservoir 42. The reward substance reservoir assembly 30 is worn by trainer 20 by fastening belt 34 around his or her waist, with case 32 in front.

Second end 53 of supply tube 50 feeds into first opening 55 of valve 52. Valve 52 controls the flow of reward substance from reservoir 42 to the horse's mouth. Delivery tube 58 is attached via first end 57 to second opening 56 of valve 52. Second end 59 of delivery tube 58 is secured to a modified snaffle bit 70, which directs the flow of reward substance into the horse's mouth. Modified bit section 74 extends perpendicularly from side member 72, opposite from the unmodified bit section 79 that extends perpendicularly from side member 71. Channel opening 77 in modified bit section 74 receives second end 59 of delivery tube 58, forming a friction fit. Aperture 76, at the end of channel 75, allows the passage of reward substance through delivery tube 58 and into the horse's mouth.

Figure 3:
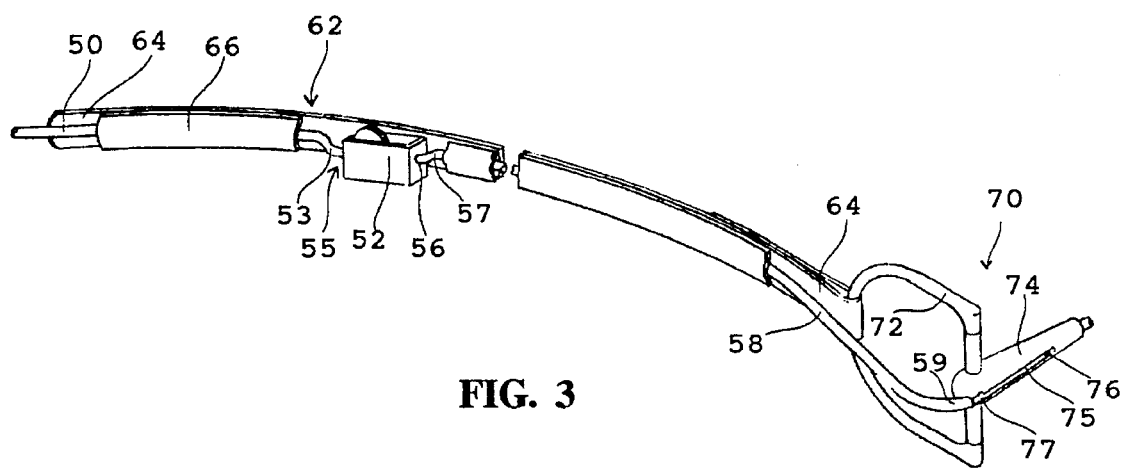
FIG. 3 is a perspective drawing of a preferred embodiment of the invention, in which the supply and delivery tubes and valve mechanism are secured within the reins connected to a bridle for an animal.
Figure 14:
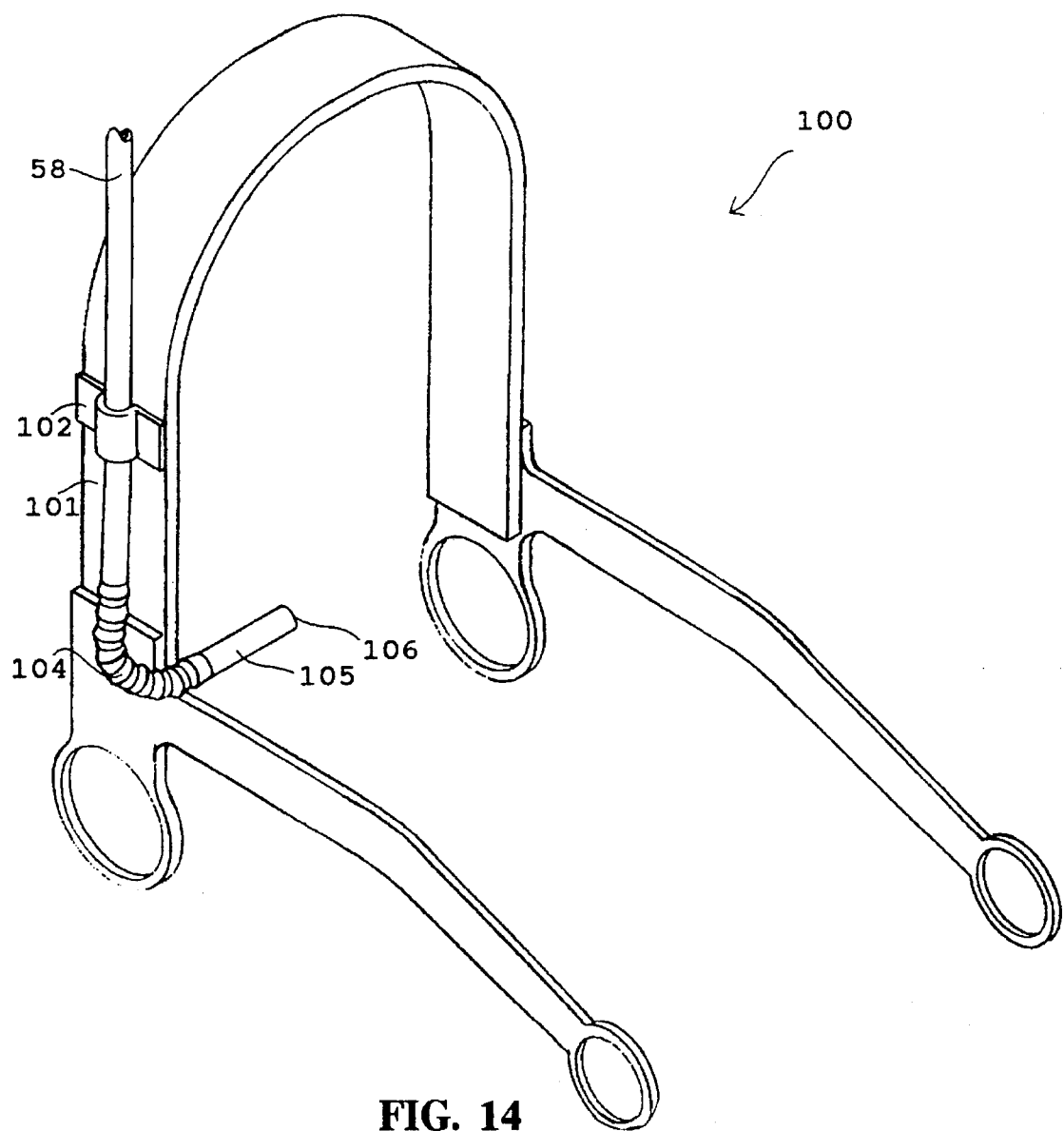
FIG. 14 is a perspective drawing of another preferred embodiment of a reward substance dispensing mechanism used with a hackamore.

FIG. 3 illustrates an alternative preferred embodiment of attaching the training apparatus to an animal. Supply tube 50 is secured between outer layer 66 and inner layer 64 of rein 62. Rein 62 runs from trainer 20's hands to bit 70, 80 (see FIG. 9), 90 (see FIG. 12), or 100 (see FIG. 14). A break in the outer layer 66 of rein 62 provides space for the valve 52 or other flow control device. Delivery tube 58 is secured between inner layer 64 and outer layer 66 of rein 62. Outer layer 66 is affixed along its edges to the outer edges of inner layer 64 by stitching, glue, staples or rivets. Inner layer 64 of rein 62 extends beyond the end of outer layer 66 and is attached to side member 72 of bit 70. The second end 59 of delivery tube 58 extends beyond the end of outer layer 66, and is secured in the animal's mouth as described in FIG. 2 above.

Figure 4:
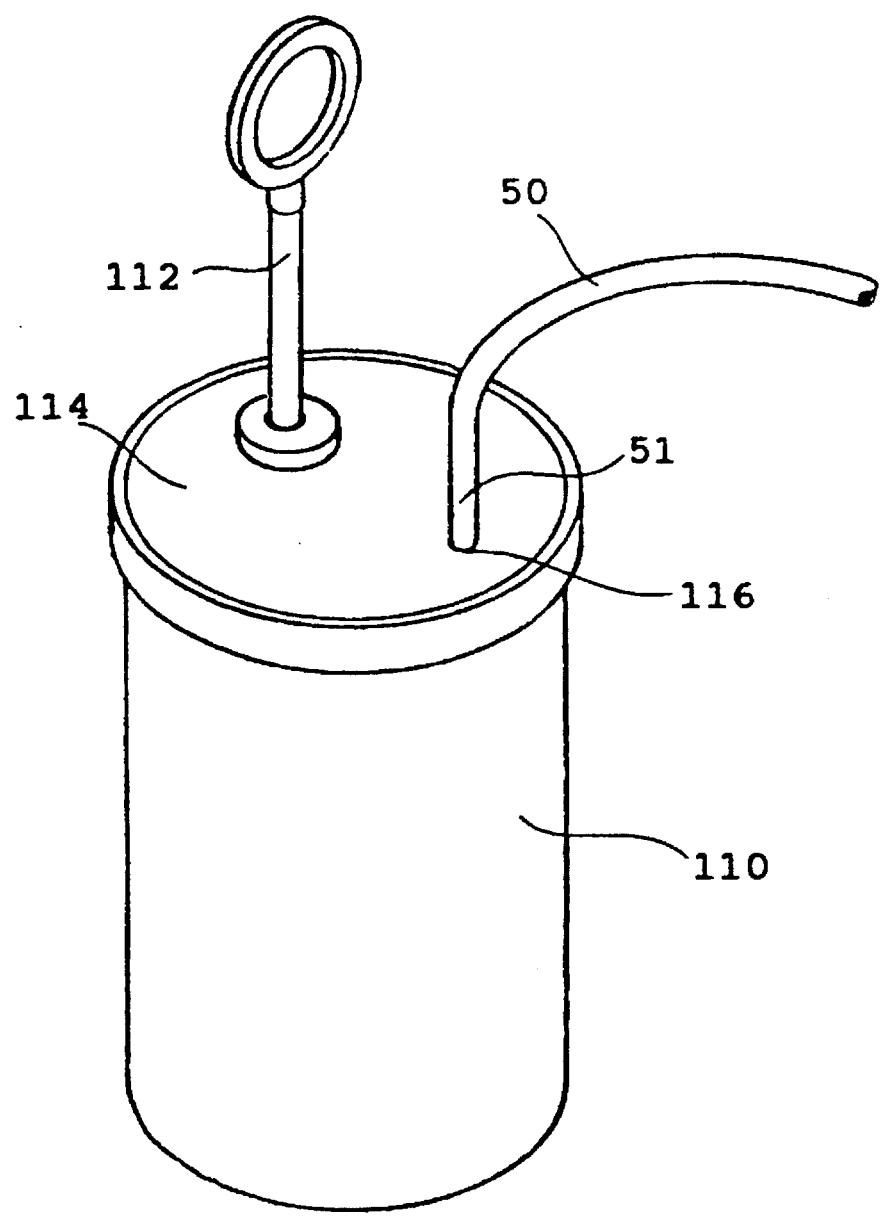
FIG. 4 is a perspective drawing of an alternative preferred embodiment of a fluid reservoir.

FIG. 4 depicts an additional alternative preferred embodiment of a fluid reservoir. A hollow container 110, having a lid 114, contains the reward substance. First end 51 of supply tube 50 is inserted into opening 116 of lid 114. The reward substance is pressurized with a pump (not shown) having a handle 112. The pressure forces the reward substance into supply tube 50. When valve 52, or other flow control device, is open, the pressurized reward substance moves through delivery tube 58, into the animal's mouth. This embodiment is particularly useful when using a slurry, or semi-liquid or pasty reward substance.

In a preferred embodiment of the invention, an animal is trained to perform behaviors of extended duration, such as trots, pirouettes, or other maneuvers. These maneuvers may last 30 seconds or longer. The trainer 20 dispenses a small amount of reward substance to the animal prior to beginning the maneuver to put the animal on notice that he is beginning a training sequence. As the animal executes the desired behavior, the trainer 20 continuously dispenses regular, measured amounts of the reward substance to the animal for the duration of the maneuver.

Figure 5:
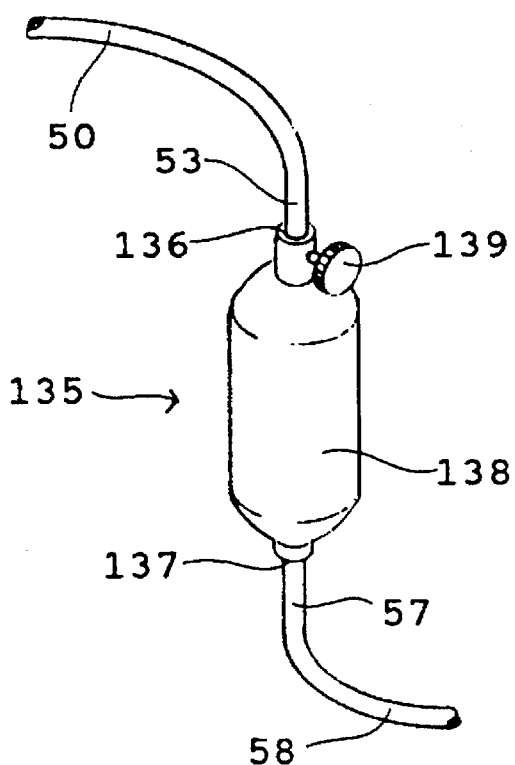
FIG. 5 is a perspective drawing of an alternative preferred embodiment of the valve mechanism used to control the flow of reward substance.

FIG. 5 is an alternative preferred embodiment of a flow control device positioned between supply tube 50 and delivery tube 58. Drip valve 135 dispenses regular, measured amounts of the reward substance during the execution of extended maneuvers, when continuous delivery of the reward substance is advantageous. Drip valve 135 functions in a manner similar to the valve used for controlling the drip of intravenous solutions in medical situations. Second end 53 of supply tube 50 enters drip valve 135 through first opening 136. First end 57 of delivery tube 58 is secured in drip valve 135 at second opening 137. A thumb screw 139, located at the top of drip valve body 138 near first opening 136, regulates the flow of a liquid reward substance from the supply tube 50. When thumb screw 139 is open, the reward substance flows into drip valve body 138. The reward substance exits drip valve body 138 dropwise, via second opening 137. The animal receives the reward substance drop by drop, over the period of time necessary to complete the maneuver. The flow of reward substance is reduced or interrupted completely by partially or fully tightening thumb screw 139.

Figure 6:
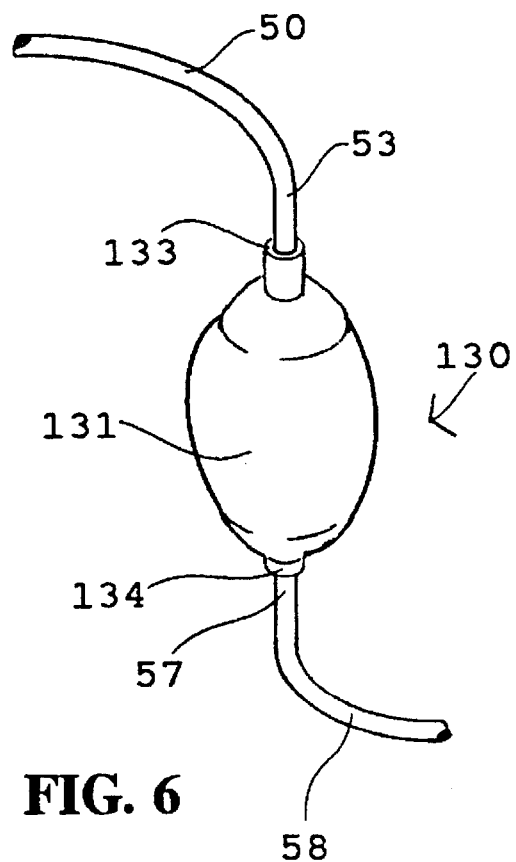
FIG. 6 is a perspective drawing of an additional alternative preferred embodiment of the valve mechanism used to control the flow of reward substance.

FIG. 6 is an alternative preferred embodiment of a flow control device positioned between supply tube 50 and delivery tube 58 to control the flow of reward substance from the reservoir 42 (see FIG. 2) to the animal's mouth. Squeeze bulb 130 is comprised of a compressible hollow body 131 having a first opening 133 and a second opening 134. First opening 133 has a flap seal (not shown) allows the reward substance to enter body 131 from supply tube 50 when the body 131 is in an uncompressed state. The flap seal (not shown) of first opening 133 also prevents the reward substance from flowing back into supply tube 50 when body 131 is compressed. Second opening 134 has a flap seal (not shown) which allows the reward substance to exit body 131 and flow into delivery tube 58 when body 131 is compressed. Second opening 134's flap seal (not shown) also prevents the reward substance from flowing back into body 131 when body 131 is released and returns to an uncompressed condition.

Figure 7:
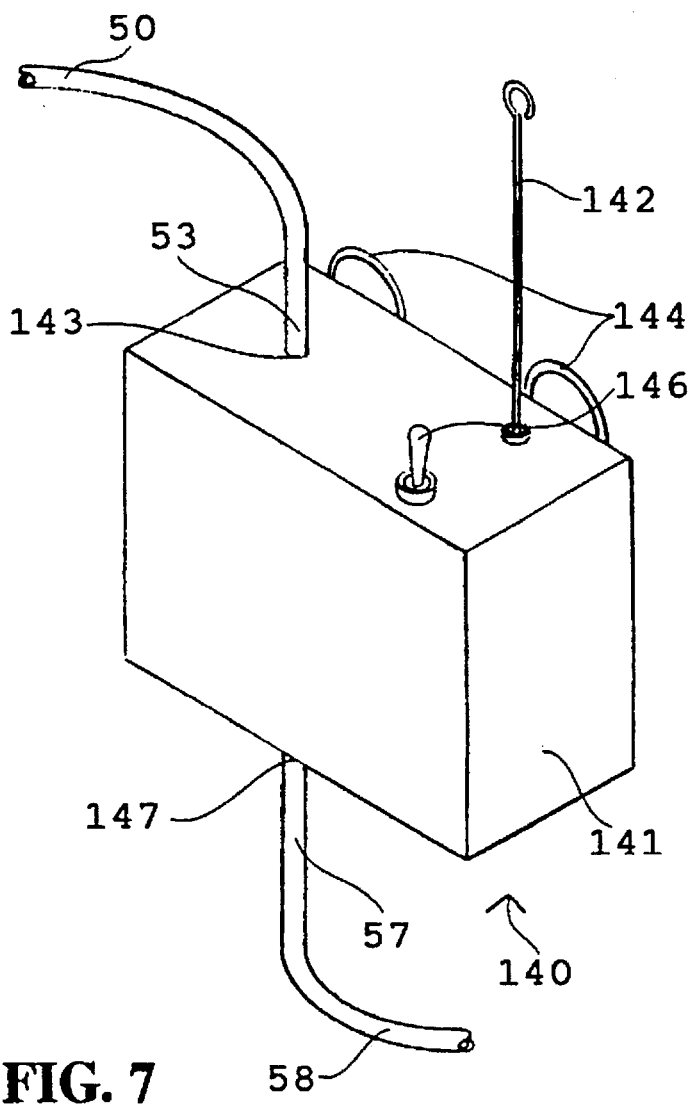
FIG. 7 is a perspective drawing of an alternative preferred embodiment of a remotely controlled valve mechanism used to control the flow of reward substance.

FIG. 7 illustrates a remotely controlled flow control device 140. A housing 141 contains a remotely controlled flow control valve (not shown) which is opened and closed by trainer 20 using a remote control mechanism (not shown). An antenna 142 receives signals from the remote control mechanism (not shown). Power switch 146 turns on device 140 so that it can receive signals from a remote control mechanism via antenna 142. Attachment loops 144 attach device 140 to the animal. In this embodiment, the reward substance is supplied to the remotely controlled flow control device 140 via supply tube 50. Supply tube second end 53 feeds into first opening 143 in housing 141. Trainer 20 uses a remote control mechanism (not shown) to open the remotely controlled flow control valve (not shown), allowing the reward substance to leave remotely controlled flow control device 140 through second opening 147 and to flow into delivery tube 58. Alternative preferred embodiments of antenna 142 are contemplated enabling remotely controlled flow control device 140 to receive signals in the form of infrared light, ultra-violet lights, laser light, microwaves, and sound, in addition to radio waves.

Figure 8:
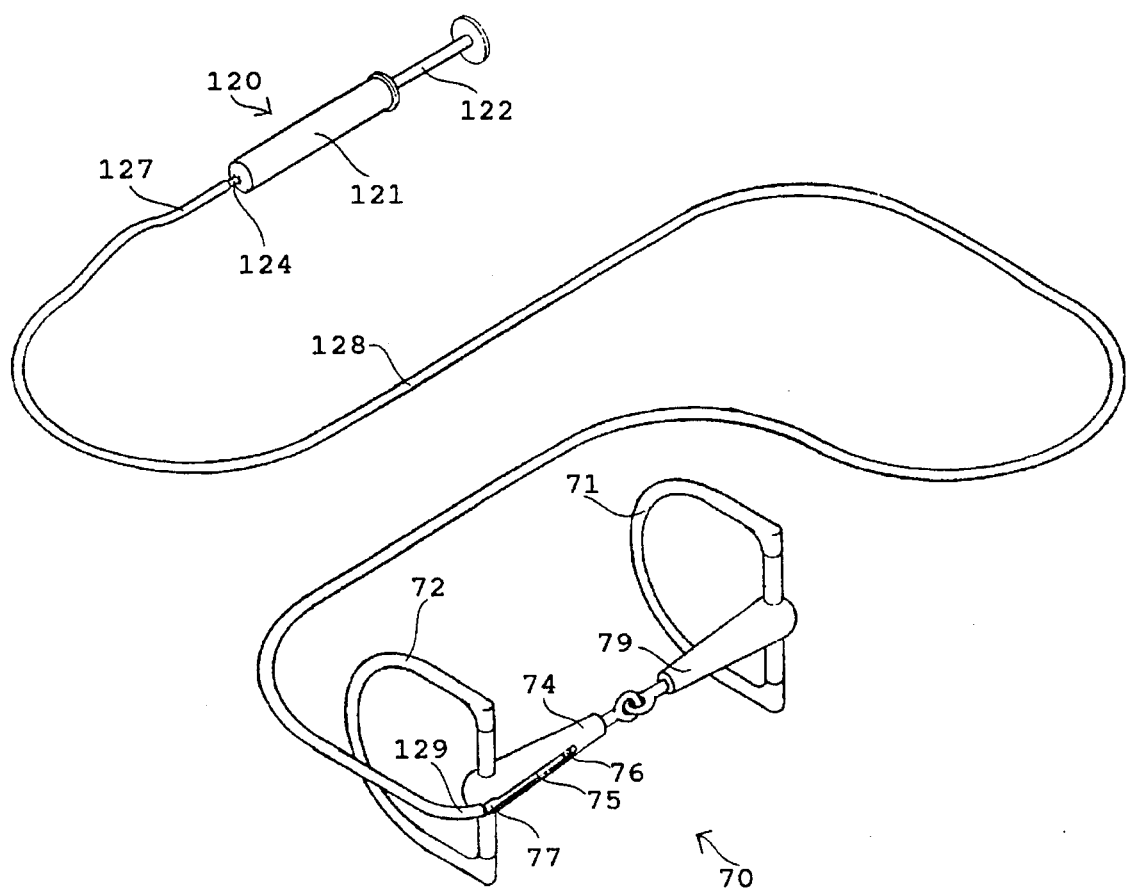
FIG. 8 is a perspective drawing of an alternative preferred embodiment of a fluid reservoir and valve mechanism.

FIG. 8 shows an alternative preferred embodiment of a reward substance reservoir, described generally as a syringe 120. Hollow syringe body 121 holds the reward substance. Plunger 122 is entirely or incrementally depressed by trainer 20 to force a selected amount of reward substance through syringe outlet 124 and into first end 127 of a delivery tube 128. Delivery tube 128 is secured to snaffle bit 70 by sliding delivery tube second end 129 into channel opening 77 of bit section 74. An aperture 76 is left at the end of channel 75, allowing the passage of reward substance through delivery tube 128 and into the horse's mouth. This embodiment works well with slurries, semi-liquid, or pasty reward substances.

Figure 9:
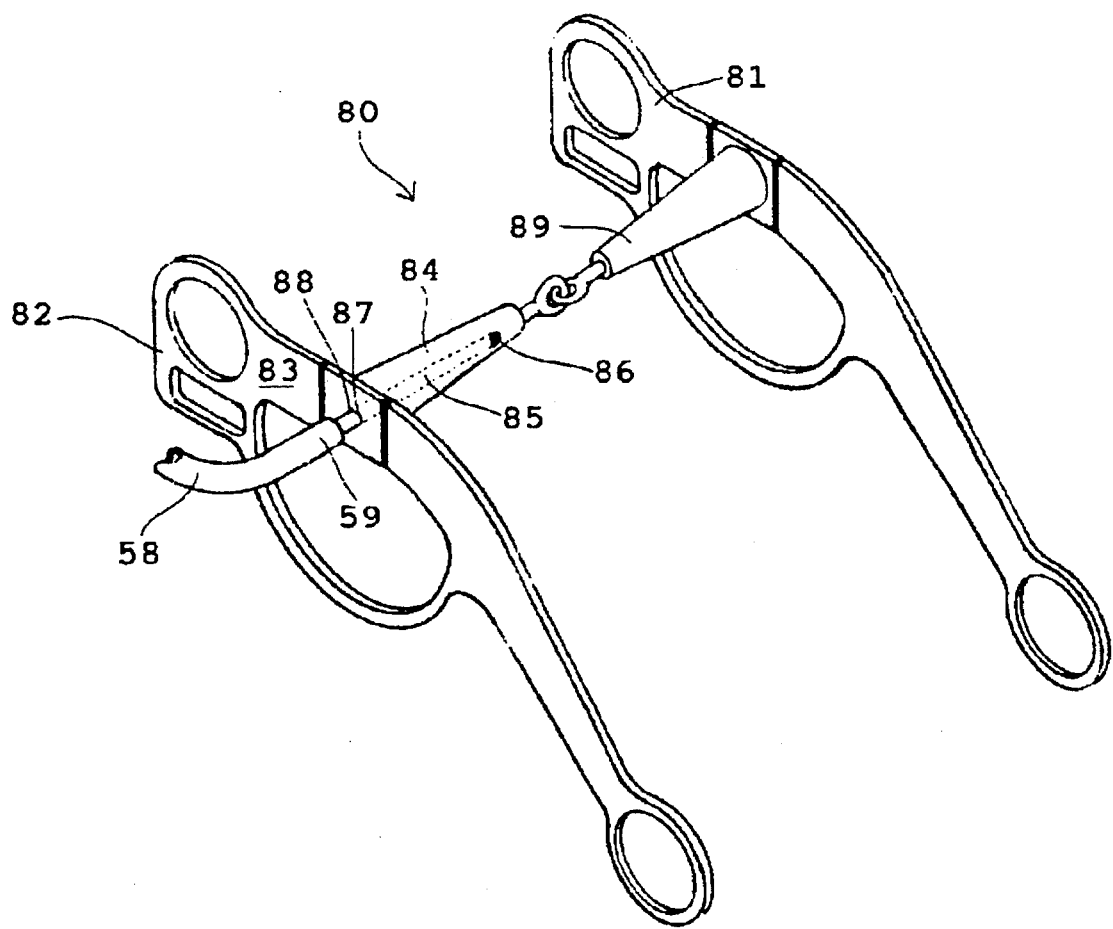
FIG. 9 is a perspective drawing of an alternative preferred embodiment of a reward substance dispensing mechanism.

FIG. 9 depicts an alternative preferred embodiment of a modified snaffle bit 80. Snaffle bit 80 consists of two side members 81 and 82. Bit section 89 extends perpendicularly from side member 81. Bit section 84 extends perpendicularly from side member 82. Bit sections 89 and 84 are linked to each other at their terminal ends at a point substantially equidistant from side members 81 and 82. Bit section 84 has a hollow interior space 85 which terminates at its first end at opening 87 on the outward facing side 83 of side member 82. Hollow interior space 85 terminates at its second end at aperture 86 substantially near the terminal end of bit section 84. A rigid or semi-rigid tube 88 protrudes from opening 87. Second end 59 of delivery tube 58 slides over and fits tightly on tube 88, thereby allowing flow of reward substance from delivery tube 58, through tube 88 and hollow interior space 85, and into the horse's mouth via aperture 86.

Figure 10A:
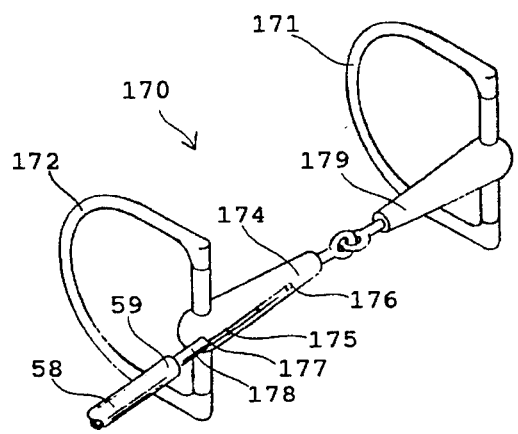
FIG. 10A is a perspective drawing of another alternative preferred embodiment of a reward substance dispensing mechanism.
Figure 10B:
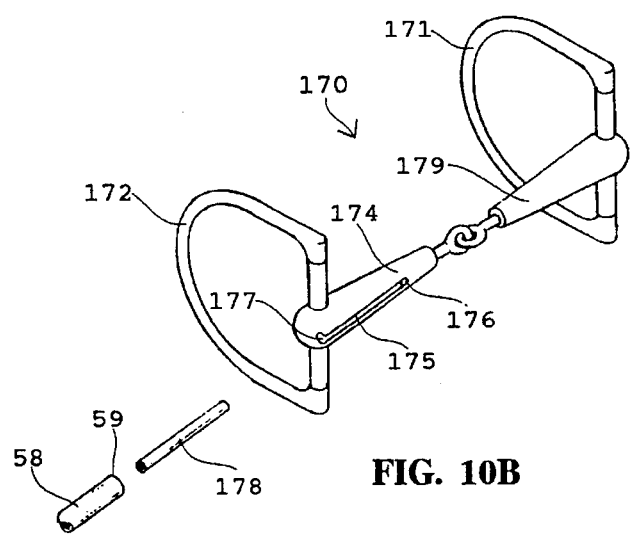
FIG. 10B is a partially exploded view of FIG. 10A.

FIGS. 10A and 10B show an alternative embodiment of snaffle bit 170, which has two side members 171 and 172. Bit section 179 extends perpendicularly from side member 171. Bit section 174 extends perpendicularly from side member 172. Bit sections 174 and 179 are linked to each other at their terminal ends at a point substantially equidistant from side members 171 and 172. Bit section 174 has a tapered channel 175, which becomes narrower toward the terminal end. In this alternative embodiment, rigid or semi-rigid tube 178 slides into and forms a friction fit in channel 175, while protruding from channel opening 177. The tapering of channel 175 prevents tube 178 from sliding into the full length of channel 175. As a result of this tapering, an aperture 176 is left open at the end of channel 175. Second end 59 of delivery tube 58 slides over and fits tightly on tube 178, thereby allowing flow of reward substance from delivery tube 58, through tube 178 and channel 175, and into the animal's mouth via aperture 176.

Figure 11A:
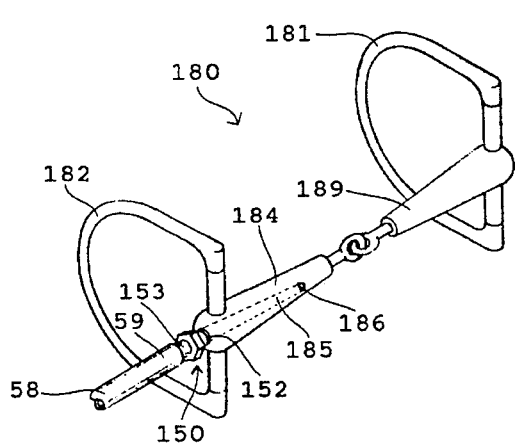
FIG. 11A is a perspective drawing of yet another alternative preferred embodiment of a reward substance dispensing mechanism.
Figure 11B:
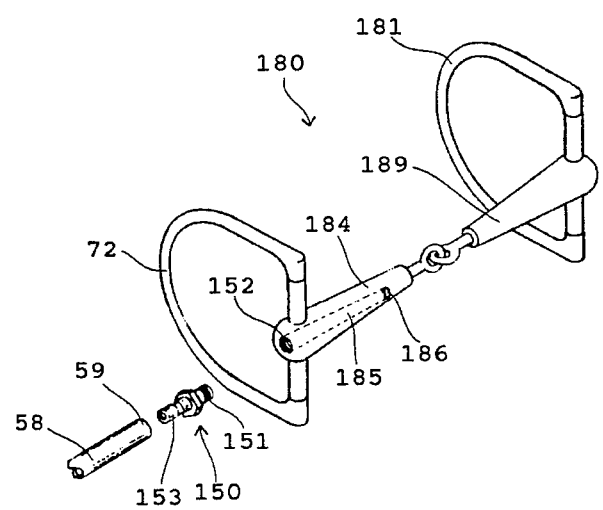
FIG. 11B is a partially exploded view of FIG. 11A.

FIGS. 11A and 11B show yet another alternative embodiment of snaffle bit 180. In this embodiment side members 181 and 182 are substantially parallel to one another. Bit section 189 extends perpendicularly from side member 181. Bit section 184 extends perpendicularly from side member 182. Bit sections 184 and 189 are linked to each other at their terminal ends, at a point substantially equidistant from side members 181 and 182. In this embodiment, bit section 184 has a hollow interior space 185 which terminates at its first end at threaded opening 152. Hollow interior space 185 terminates at its second end at aperture 186 near the terminal end of bit section 184. Female threaded opening 152 receives male threaded first end 151 of fitting 150. Second end 59 of delivery tube 58 fits over second end 153 of fitting 150, thereby allowing the flow of reward substance from delivery tube 58, through fitting 150 and hollow interior 185, and into the horse's mouth via aperture 186. While first end 151 and threaded opening 152 are described as threaded in this embodiment, non-threaded substitutes are contemplated which are attachable by a friction fit.

Figure 12:
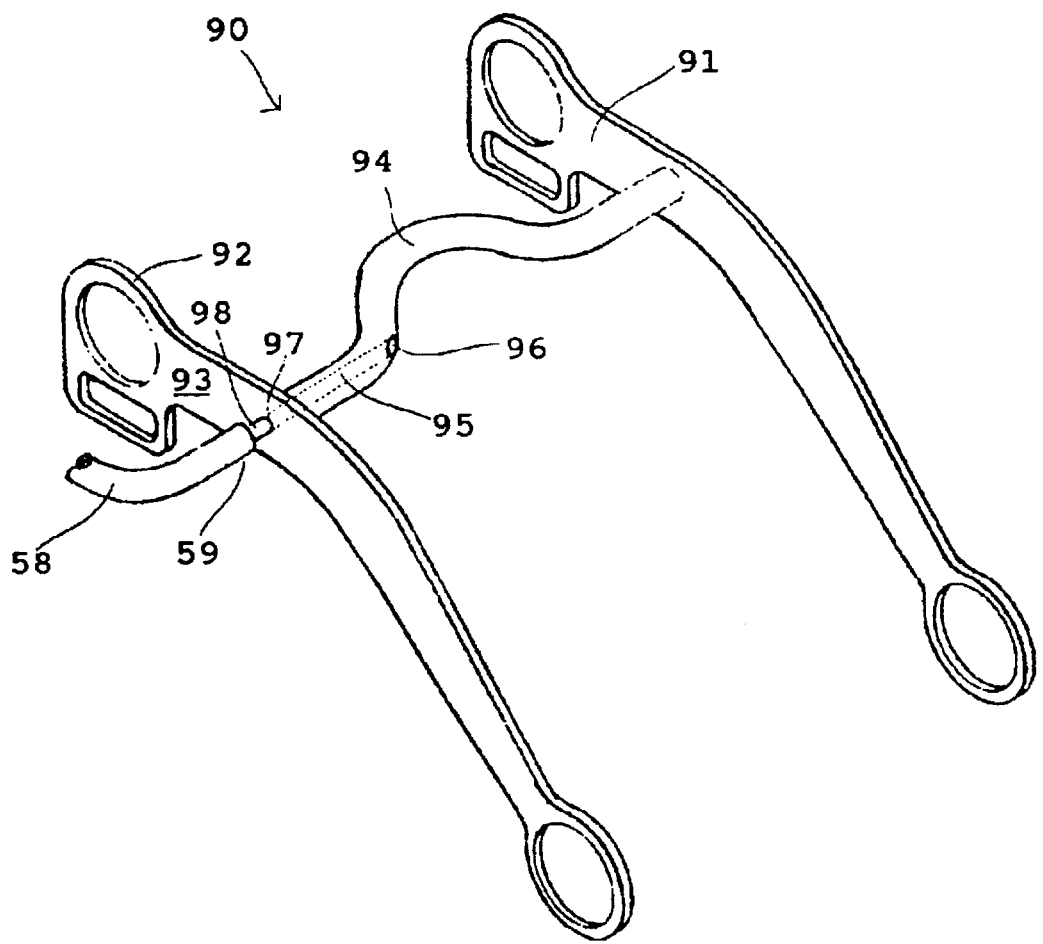
FIG. 12 is a perspective drawing of an alternative preferred embodiment of a reward substance dispensing mechanism.

FIG. 12 depicts a preferred embodiment of the invention when used with a curb bit 90. The curb bit has substantially parallel side members 91 and 92 and a curved, tubular bit 94 which is fixedly attached at its ends to side members 91 and 92, perpendicularly oriented so that side members 91 and 92 are spaced apart from but parallel to one another. The curved tubular bit 94 has a hollow interior space 95 which terminates at its first end at opening 97 on the outward facing side 93 of side member 92. Hollow interior space 95 terminates at its second end at aperture 96 near the center of the curved cylindrical bit 94. A rigid or semi-rigid tube 98 protrudes from opening 97. Second end 59 of delivery tube 58 slides over and fits tightly on tube 98, thereby allowing flow of reward substance from delivery tube 58, through tube 98 and hollow interior 95, and into the horse's mouth via aperture 96.

FIGS. 13A and 13B show an unmodified snaffle bit assembly 190. Side members 191 and 192 are substantially parallel to one another. Bit section 193 extends perpendicularly from side member 191. Bit section 194 extends perpendicularly from side member 192. Bit sections 193 and 194 are linked to each other at their terminal ends at a point substantially equidistant from side members 191 and 192. In this preferred embodiment, second end 59 of delivery tube 58 is connected to bit section 194 with a snap-on connector 195 having a first section 196 and a second section 198. First section 195 is of a size and shape which will receive delivery tube second end 59 and hold it firmly but removably. Second section 198 is of a size and shape which will firmly but removably receive bit section 194, thus securing delivery tube 58 to the snaffle bit 190, without requiring modification of the bit assembly, and allowing the flow of reward substance into the horse's mouth, via opening 199 in delivery tube second end 59.

FIG. 1.4 illustrates an alternative preferred embodiment of the invention as used with a hackamore 100, which does not have a bit. Delivery tube 58 is attached to the substantially vertical side member 101 with a clip 102. A flexible positionable elbow 104 at delivery tube second end 105 allows the variable positioning of delivery tube second end 105 so that opening 106 is positioned substantially within the mouth of the horse.

Figure 15:
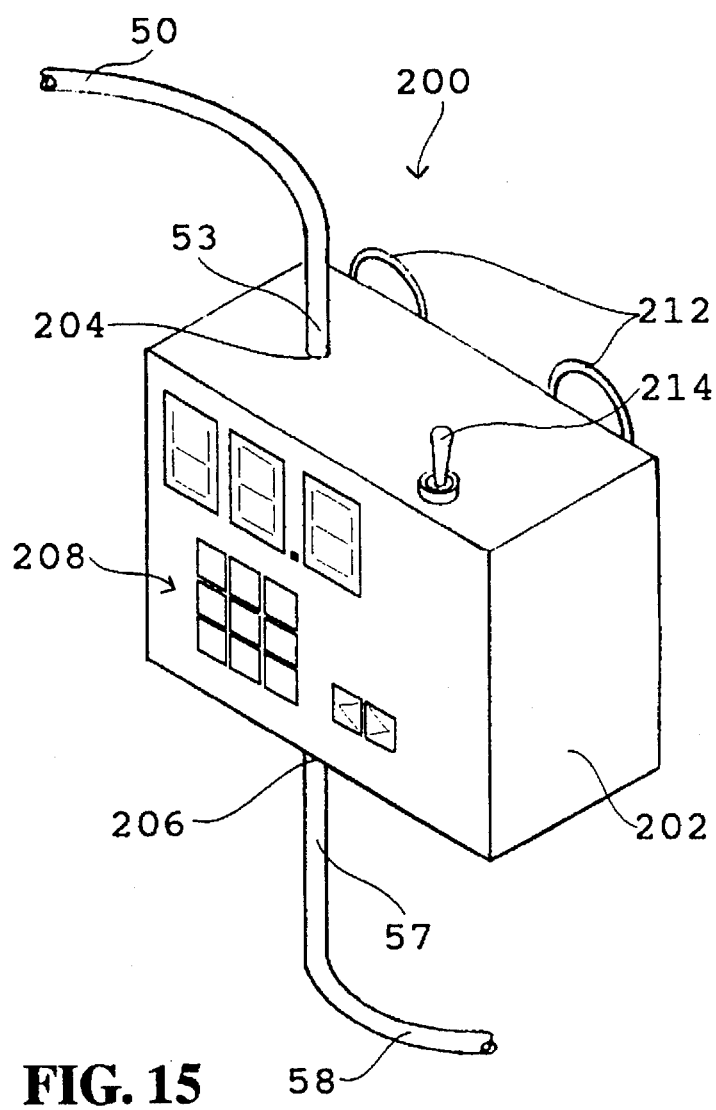
FIG. 15 is a perspective drawing of a preferred embodiment of a valve mechanism used in conjunction with a timer.

In an alternative preferred embodiment of the new training method of this invention, trainer 20 uses the training apparatus to elicit schedule induced behavior. Once the animal being trained has fully or partially mastered a maneuver or series of maneuvers, the trainer may provide primary reinforcement to the animal at regular timed intervals. Primary reinforcement delivered in this manner causes the animal to remain focused on the desired behavior, and to continue performance of the desired behavior as long as the reward continues to be provided at regular intervals. FIG. 15 depicts a timer-activated flow control device 200, equipped with power switch 214, which starts and stops the flow of reward substance at predetermined timed intervals, as necessary to elicit schedule induced behavior. In this embodiment, the reward substance is supplied to the timer-activated flow control device 200 via supply tube 50. Supply tube second end 53 feeds into first opening 204 in housing 202. Before beginning the training session, trainer 20 uses a keypad 208 and display 211 to set a timer 210 (not shown) for the desired elapsed time between rewards. The training session is then conducted, with the timer-activated flow control device 200 providing timed intermittent bursts of reward substance to the animal, according to the timing instructions input by the trainer (not shown). When each selected time period has elapsed, the timer 210 signals the flow control valve (not shown) to open, allowing the reward substance to leave timer-activated flow control device 200 through second opening 206 and to flow into delivery tube 58. Attachment loops 212 are used to secure timer-activated flow control device 200 to the animal. While the method and apparatus of the new invention has been described in detail with respect to its use in training horses, the invention is also intended for use with other animals, such as mules, donkeys, llamas, alpacas, goats, and dogs. All of the bridle, bit, and other modified tack apparatus shown in the drawings and otherwise described are suitable for use with llamas, alpacas, donkeys, mules, goats, and other pack animals. However, this method and apparatus is also very useful in training animals such as dogs for general domestication, hunting purposes, attack and defense purposes, drug detection and law enforcement purposes, seeing-eye dogs, or even as pack animals.

In a preferred embodiment of this method and apparatus used with a dog (not shown) delivery tube 58 (see FIG. 2) is attached to an existing muzzle (not shown) by means of a clip (not shown) or other fastening device (not shown). The muzzle (not shown) fits over the dog's mouth in a standard configuration, with the training apparatus, including the reward substance reservoir 42 (see FIG. 2) and a remotely controlled flow control device 140 (see FIG. 6), strapped to the dog's back. In this alternative preferred embodiment, trainer 20 operates the remotely controlled flow control device 140 by means of a remote control mechanism (not shown). The training method used to elicit desired behavior from a dog is the same training method used to elicit desired behavior from a horse, as described herein.

In an alternative preferred embodiment, it is contemplated that delivery tube 58 is held in a dog's mouth by means of an apparatus similar to the hackamore depicted in FIG. 13. In a modified hackamore configuration (not shown), end 59 of delivery tube 58 is held in position in a dog's mouth so that opening 106 is inside the dog's mouth, and a reward substance is dispensed to the dog through opening 106. This application is useful when training a dog to perform activities which require biting, retrieving, or other use of the dog's jaws and teeth.

In compliance with the statutes, the invention has been described in language more or less specific as to structural features. While this invention is susceptible to embodiment in different forms, the drawings in the specification illustrate preferred embodiments of the invention, with the understanding that the present disclosure is to be considered an exemplification of the principles of the invention, and the disclosure is not intended to limit the invention to the particular embodiments described.

I claim:

1. A primary reinforcement training apparatus to reinforce desired animal behavior during training by providing a reward to an animal simultaneously with, or immediately following, performance of a desired behavior, comprising:

a. reservoir containing a reward substance selected from the group consisting of liquids, solids, and mixtures of liquids and solids;

b. a flow control means for starting and stopping of a flow of the reward substance from the reservoir, said flow control means being operable simultaneously with, or immediately following, an exhibition of the desired behavior by the animal being trained;

c. a supply tube connecting said reservoir to the flow control means;

d. a delivery tube removably affixed to the substantially vertical side member of a hackamore or bitless bridle, and then bent or curved at an angle so that the terminal end of the delivery tube is placed inside the animal's mouth, said delivery tube connecting the flow control means to the mouth of the animal; and e. a means of securing one end of the delivery tube in the mouth of the animal.

2. A method for training animals using primary reinforcement to reinforce desired animal behavior during training by providing a reward to an animal simultaneously with, or immediately following, a desired behavior, comprising the steps of:

a. selecting a reward substance to be used during an animal's training session, said reward substance selected from the group consisting of liquids, solids, and mixtures of liquids and solids;

b. containing the reward substance in a reservoir during the animal's training session;

c. connecting the reservoir to a flow control means by means of a supply tube;

d. connecting the flow control means to the animal's mouth by means of a delivery tube;

e. securing one end of the delivery tube in the mouth of the animal; and f. controlling the starting and stopping of a flow of the reward substance from the reservoir, said flow control occurring simultaneously with, or immediately following, an exhibition of the desired behavior by the animal during the animal's training session.

3. The method of claim 2, wherein the reward substance is contained by use of a bottle having a removable cap with an opening for said supply tube.

4. The apparatus of claim 2, wherein the reward substance is contained by use of a syringe having a hollow syringe body and a plunger, said hollow syringe body functioning as a supply tube and said plunger being operated to control the flow of the reward substance.

5. The method of claim 2, wherein the reward substance is contained by use of a sealed container having a pressurizing means, which is pressurized to greater than atmospheric pressure after being filled with the reward substance.

6. The method of claim 5, wherein the sealed container is pressurized by means of a manual pump.

7. The method of claim 2, wherein the supply tube is flexible.

8. The method of claim 2, wherein the delivery tube is flexible.

9. The method of claim 2, wherein the flow of the reward substance is controlled by means of a stop cock valve.

10. The method of claim 2, wherein the flow of the reward substance is controlled by means of a pump.

11. The method of claim 2, wherein the flow control means is a drip valve.

12. The method of claim 2, wherein the means of securing the end of said delivery tube in the mouth of an animal is a bridle bit having a channel running parallel to its length which will receive said end of said tube, and hold it tightly therein, leaving an opening at the end of said channel through which fluid flows into the animal's mouth.

13. The method of claim 2, wherein the end of said delivery tube is secured with a threaded coupling to an opening in one end of a bridle bit, said bit having a hollow interior portion for the passage of liquid, and a hole at the terminal end of said hollow interior portion in said bit through which fluid flows into the animal's mouth.

14. The method of claim 2 wherein said delivery tube is removably affixed to the substantially vertical side member of a hackamore or bitless bridle, and then bent or curved at an angle so that the terminal end of said delivery tube rests inside the animal's mouth.

15. A method for training animals using primary reinforcement to reinforce desired animal behavior during training by providing a reward to an animal simultaneously with, or immediately following, a desired behavior, comprising the steps of:

a. selecting a reward substance to be used during an animal's training session, said reward substance selected from the group consisting of liquids, solids, and mixtures of liquids and solids;

b. containing the reward substance in a reservoir during the animal's training session;

c. connecting the reservoir to a flow control means by means of a supply tube;

d. connecting the flow control means to the animal's mouth by means of a delivery tube;

e. securing one end of the delivery tube in the mouth of the animal; and f. controlling the starting and stopping of a flow of the reward substance from the reservoir, by means of a bulb which can be compressed by hand, said flow control occurring simultaneously with, or immediately following, an exhibition of the desired behavior by the animal during the animal's training session.

16. A method for training animals using primary reinforcement to reinforce desired animal behavior during training by providing a reward to an animal simultaneously with, or immediately following, a desired behavior, comprising the steps of:

a. selecting a reward substance to be used during an animal's training session, said reward substance selected from the group consisting of liquids, solids, and mixtures of liquids and solids;

b. containing the reward substance in a reservoir during the animal's training session;

c. connecting the reservoir to a flow control means by means of a supply tube;

d. connecting the flow control means to the animal's mouth by means of a delivery tube;

e. securing one end of the delivery tube in the mouth of the animal; and f. controlling the starting and stopping of a flow of the reward substance from the reservoir, by the flow control means being activated and deactivated by a remotely controlled control device, said flow control occurring simultaneously with, or immediately following, an exhibition of the desired behavior by the animal during the animal's training session.

17. A method for training animals using primary reinforcement to reinforce desired animal behavior during training by providing a reward to an animal simultaneously with, or immediately following, a desired behavior, comprising the steps of:

a. selecting a reward substance to be used during the animal's training session, said reward substance selected from the group consisting of liquids, solids, and mixtures of liquids and solids;

b. containing the reward substance in a reservoir during the animal's training session;

c. connecting the reservoir to a flow control means by means of a supply tube;

d. connecting the flow control means to the animal's mouth by means of a delivery tube;

e. securing one end of the delivery tube in the mouth of the animal; and f. controlling the starting and stopping of a flow of the reward substance from the reservoir, by the flow control means being activated and deactivated by a timer, said flow control occurring simultaneously with, or immediately following, an exhibition of the desired behavior by the animal during the animal's training session.

* * * * *